United States Patent
Cabo

(10) Patent No.: US 6,837,073 B2
(45) Date of Patent: Jan. 4, 2005

(54) METHOD FOR MAKING FUSED GLASS SHEETS

(76) Inventor: Ana M. Cabo, 1485 Lycoming St., No. 302, San Diego, CA (US) 92154-5724

( * ) Notice: Subject to any disclaimer, the term of this patent is extended or adjusted under 35 U.S.C. 154(b) by 415 days.

(21) Appl. No.: 10/171,013

(22) Filed: Jun. 13, 2002

(65) Prior Publication Data

US 2003/0014998 A1 Jan. 23, 2003

Related U.S. Application Data

(60) Provisional application No. 60/306,583, filed on Jul. 18, 2001.

(51) Int. Cl.[7] ........................................... C03B 23/203
(52) U.S. Cl. ....................................................... 65/43
(58) Field of Search ........................... 65/41, 43, 60.1, 65/60.2, 60.3, 60.4; 156/89.11, 89.23, 89.24

(56) References Cited

U.S. PATENT DOCUMENTS

| | | | |
|---|---|---|---|
| 3,852,148 A | 12/1974 | Pryor et al. .................... 161/41 |
| 4,339,257 A | 7/1982 | Ueda .......................... 65/60.5 |
| 4,596,590 A | 6/1986 | Boaz .......................... 65/60.51 |
| 4,684,389 A | 8/1987 | Boaz ........................... 65/60.5 |
| 4,770,685 A | 9/1988 | Boaz ............................ 65/106 |
| 4,837,383 A | 6/1989 | Andrews ...................... 427/108 |
| 4,857,096 A | 8/1989 | Boaz .......................... 65/60.51 |
| 5,120,570 A | 6/1992 | Boaz .......................... 427/45.1 |
| 5,328,753 A | 7/1994 | Boaz ........................... 428/210 |
| 5,820,991 A | * 10/1998 | Cabo ........................... 428/432 |

\* cited by examiner

*Primary Examiner*—Steven P. Griffin
*Assistant Examiner*—Carmen Lyles-Irving
(74) *Attorney, Agent, or Firm*—Louis L. Dachs

(57) ABSTRACT

The method includes: providing first and second sheets of translucent glass having first and second principle sides, coating a portion of one of the first principle sides of first and second sheets with a layer of ceramic paint; placing the first and second sides of coated translucent glass together such that first principle surfaces are in contact with each other forming a sandwich; applying a layer of material on a portion of an external surface of one of first and second glass sheets that will cause differential heating of the layer of ceramic paint applied to a portion of one of the first principle side of first and second sheets when the sandwich is heated to temperatures which will fuse first and second sheets together; and heating the sandwich to a sufficient temperature for a sufficient time such that first and second coated sheets of glass are fused together.

10 Claims, 3 Drawing Sheets

METHOD FOR MAKING FUSED GLASS SHEETS

RELATED US APPLICATION DATA

This application claims the benefit of U.S. Provisional Application No. 60/306,583 filed Jul. 18, 2001.

BACKGROUND OF THE INVENTION

1. Field of the Invention

The invention relates to the field of glass product manufacturing, and, in particular to a method of making colored glass sheets containing dark portions.

2. Description of Related Art

It is well known to use ceramic paints in the form of glass frits to coat the surface of glass sheet or at least a portion thereof with glass frits. For example, in the U.S. Pat. No. 5,328,753 "Glass Sheet Having Painted Exterior Surfaces" by T. Boaz discloses a process for painting the exterior surface of a glass sheet by applying consecutive layers of metal-containing ceramic paint and an organic paint. The coated glass sheet is then heated to a plastic set temperature, a temperature wherein the glass is capable of being permanently bent, but a temperature below which an applied stress will not cause permanent deformation, such that the ceramic paint is fused to the glass. U.S. Pat. No. 4,596,590 "Method Of Forming A Glass Sheet With A Ceramic Paint Thereon", U.S. Pat. No. 4,684,389 "Method Of Forming A Glass Sheet With An Oil based Ceramic Paint Thereon", U.S. Pat. No. 4,770,685 "Method Of Manufacturing Formed Glass Sheet With Paint Thereon" and U.S. Pat. No. 4,857,096 "Method Of Forming A Glass Sheet With A UV-Base Ceramic Paint", all by P. T. Boaz all disclose a method of forming glass sheet with multi-layers of ceramic paint thereon and compositions thereof. Another example of applying ceramic paints to glass sheet can be found in U.S. Pat. No. 4,339,257 "Method Of Producing Curved And Partly Colored Glass Sheet by K. Ueda also discloses a method of forming glass sheet with glass frit coatings. Of additional interest is U.S. Pat. No. 4,837,383 "Glass Enamel" by R. Andrews, which discloses a formulation for an enamel opaque useful in providing an opaque border for both automotive and architectural glazing.

Thus it is old in the art to make ceramic or glass tiles and the like by: 1) taking two glass sheets and coating one or both facing surfaces; 2) joining them together, and fusing them together in an oven or kiln. However, while all these glass fabrication systems can produce colorful sheets they do not provide a simple way to produce a dark spot within the sheet. In the past, some sort of special coating had to be applied to the surfaces of sheets to be bonded to each other prior to fusing them together. This was a time consuming operation that had to be carefully performed.

Thus, it is a primary object of the invention to provide a ceramic panel or tile that incorporates colors as well as a dark portion.

It is another primary object of the invention to provide a ceramic panel or tile that incorporates a color wherein the panels can be completely covered with color producing frits and no additional internal coating need be applied prior to fusing the two glass panels or plates together.

SUMMARY OF THE INVENTION

The invention is a method of making a composite glass sheet. In detail, the steps include:

1. Providing first and second sheets of translucent glass having first and second principal sides. The preferred thickness of the glass is between 0.03 inch to 2.0 inches. The second principle sides can be textured if desired.

2. Coating at least a portion of at least one of the first principle sides of the first and second sheets with a layer of ceramic paint. The ceramic paints preferably include metal powders selected from the group consisting of zinc, aluminum, tin, antimony, cadmium, chromium, lead, cobalt, copper, manganese, iron, silicon, titanium, tungsten, and bismuth. It is also preferred that at least one of the first and second layers of ceramic paint contain pigmentation. It is preferred that the concentration of metal powder be between 1 and 40 percent.

3. Placing said first and second sheets of coated translucent glass together such that said first principle surfaces are in contact with each other forming a sandwich.

4. Applying a layer of material on a portion of at least one external surface of one of the first and second glass sheets that will cause differential heating of the layer of ceramic paint when the sandwich is heated to temperatures which will fuse the first and second sheets together. The preferred material is an organic binder containing either carboxymethyl cellulose, or cellulose or carbohydrates. In addition, organic binders containing a polyacrylate are usable.

5. Heating the sandwich to a sufficient temperature for a sufficient time such that the first and second coated sheets of glass are fused together.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention

DESCRIPTION OF THE PREFERRED EMBODIMENT

Figure 1:
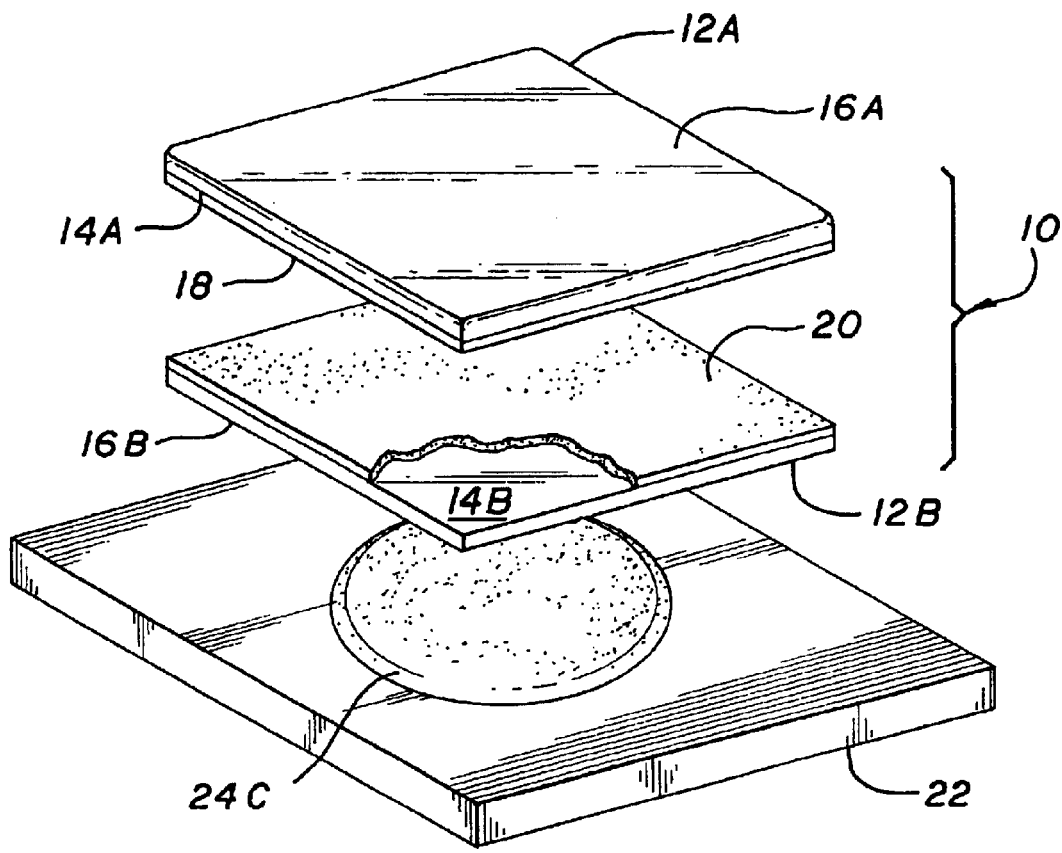
FIG. 1 is an exploded perspective view composite glass sheet.

In FIGS. 1–4, a composite glass sheet assembly is illustrated, generally indicated by numeral 10, and which includes translucent glass sheets 12A and 12B having first and second principle sides 14A and 14B and 16A and 16B, respectively. The first principle sides 14A and 14B are at least partially coated with ceramic paints 18 and 20.

The glass sheets 12A and 12B may be of any thickness or size. However, the thickness range of the glass should be between 0.03 of an inch to about 2.0 inches thick. The glass sheets 12A and 12B may be clear or may be colored, but should at least be translucent. The second principle sides 16A and 16B can be textured or smooth. The coefficient of expansions of the glass sheet should be in the range of about $80 \times 10^7$ to about $125 \times 10^7$ inch/inch, preferable about $85 \times 10^7$ to about $110 \times 10^7$ inch/inch. Suitable glass includes one or more of the following principal raw materials: silica, boric oxide, soda, potash, lead oxide, lime, alumna, magnesia, barium oxide, and calcium phosphate. The glass sheets 12A and 12B can be annealed or they can be tempered after the glass sheets have been fused by the heating process or in a separate firing. This will add resistance to impact and thermal shock.

Ceramic paint coatings 18 and 20 are applied to the first principle surfaces 14A and 14B of the glass sheets 12A and 12B, generally, comprise a ceramic frit, pigment, and a vehicle. Suitable ceramic frits for preparing the ceramic paints include one or more glass frits prepared from conventional bismuth alkali borosilicate, lead borosilicate glass composition, soda-lime-boro-silicate-alumina composition, lead monosilicate or from a lime-boro-alumina-silicate material. Alternatively, the frit may comprise a combination of metal oxides such as those selected from the group consisting of oxides of lead, titanium, selenium, calcium carbonate. sodium, boron, lithium, iron, zirconium, potassium, zinc, calcium, alumna, tin, manganese, vanadium, molybdenum, magnesium, and the like.

The frit is prepared by melting the frit batch ingredients at temperatures from about 1,650 degrees F. to about 2,900 degrees F., and then quenching the molten frit composition either with the use of water or by pouring the melt between cooled metal rolls rotating in opposite directions. The resulting chunks of frit are then ground into fine particles so as to pass through a 325 US Standard Sieve mesh screen or finer A lead borosilicate glass frit or soda-lime-borosilicate glass frit is preferred because they are readily available and relatively inexpensive. The frit is generally added to the ceramic paint composition in a concentration from about 20 to about 80 percent by weight. Preferably, the concentration of ceramic frit in the ceramic paint is from about 30 to about 50 percent by weight.

Pigments, generally, comprise mixtures of metal oxides which together act as a coloring agent for the ceramic paint. These metal oxides include, but are not limited to, cobalt, manganese, iron, copper, nickel, oxides of chromium, selenium, zirconium, or tin. Mixtures of these metal oxides form various colors, as is well known in the glass making industry., Up to temperatures of about 1600 degrees F., the metal oxide pigments are non-reactive with one another, or with other compounds contained in the ceramic paint or the glass sheets. The concentration of pigment in the ceramic paint composition generally may vary from 0 to about 30 percent by weight. When no pigmentation is used, the result is a substantially transparent coating.

Metal powders which may be employed in the ceramic paint comprise but are not necessarily limited to, powders prepared from zinc, aluminum, tin, antimony cadmium, chromium, lead, cobalt, copper, manganese, iron, silicon, titanium, tungsten, and bismuth, as well as mixtures and alloys thereof. A preferred metal powder comprises finely divided lead metal powder. The metal powder is generally present in the ceramic paint composition at a concentration from about 0 to about 40 percent by weight. Conventionally adjutants such as, for example, filler, thermal stabilizers, dyes, and the like, as well as mixtures thereof may also be included in the metal-containing ceramic paint in amounts generally not exceeding 60 percent by weight of the paint. Other suitable ceramic paints include metallics and lusters, which are also readily available. Particularly useful ceramic paints include but are not limited to those produced by Drakenfeld Colors, Drakenfeld Co., Washington Pa. 15301, Reusche Colors and Silver Stains, L. Reusche & Co., Newark, N.J. 07105, Satellite Colors, Satellite Textural Glazes, Logansport, La. 71049, Thompson Colors, Thompson Enamel Co., Newport, Ky. 41072, and Hanovia Overglazes, Metallics, and Lusters, Englehard Corp., Edison, N.J. 08818.

Vehicles or carriers suitable for use in the ceramic paint composition generally compose organic materials, which allow the paint to flow at application temperatures. Examples of useful vehicles include, but are not necessarily limited to water, alcohol, pine oil, vegetable oils, mineral oils, hot melt materials and the like as well as mixtures thereof. A preferred vehicle or carrier is a mixture of water and alcohol. The vehicle may comprise from about 1 to about 40 percent by weight. The coefficient of expansion of these ceramic paints must be adjusted to match the glass sheets, if other than very thin applications are intended. The changing of coefficient is accomplished by adding flux, such as a lead bridge, lead monosilicate or glass bridge. The method of changing the coefficient of expansion in the ceramic paints is well known in the glass industry. The ceramic paints may be applied to the surface of a glass sheet utilizing conventional paint application methods, e.g., sifting, spraying, screen printing, painting and trailing. In a screen printing operation, the ceramic paint is spread across a screen superimposed over the glass sheet using a squeegee to force the paint through the screen pattern onto the surface of the glass sheet.

Figure 2:
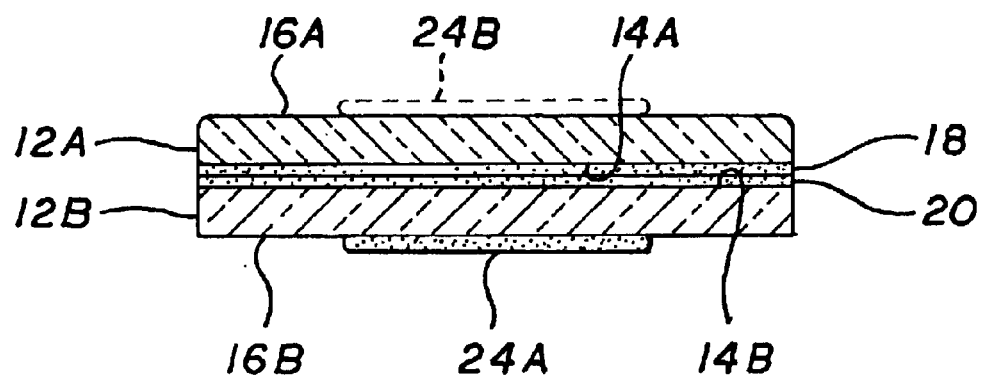
FIG. 2 is cross-sectional view of the composite glass sheet assembly shown in FIG. 1.
Figure 3:
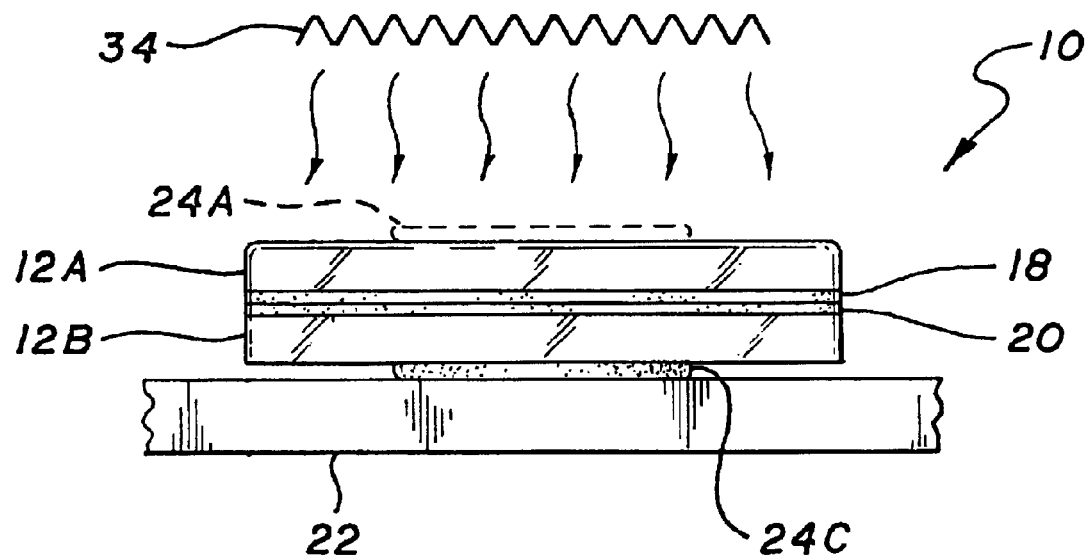
FIG. 3 is a side view of the composite glass sheet assembly shown in FIG. 2 mounted on an internal surface of a oven or kiln with a coating of a compound on the surface of the composite glass sheet facing the internal surface of the kiln.

Still referring to FIGS. 1–4, the method of manufacturing is accomplished by first applying the coatings of ceramic paints 18 and 20 to the first principle surfaces 14A and 14B of the glass sheets 12A and 12B. The sheets are sandwiched together with the principle sides 14A and 14B in contact with each other. Thereafter a layer of material 24A is applied to at least a portion of the external surface 16B of the glass sheet 12B (FIG. 2). The layer of material can also be applied to surface 16A of glass sheet 16A, with the compound indicated in dotted lines and numeral 24B. The material can also be simultaneously used on both surfaces 16A and 16B with almost identical results. The material can also be applied to surface 22 as illustrated in FIGS. 1 and 3 and indicated by numeral 24C. The layer of material 24A, 24B or 24C can be any compound that will effect the heat transfer (increase) into the ceramic paints 18 and 20 without interfering with the fusion process or effecting the sides 16A or 16B. In addition, the layer of material should not cause significant differential cooling rates in the glass. Organic binders work quiet well. For example, polyacrylate dispersions in water can be brushed on the surfaces 16A and/or 16B. Another useful organic binder is one containing cellulose gum as manufactured by Hercules Incorporated, Wilmington, Del. A third useful organic binder is a carbohydrate ($C_6H_{10}O_5$). The glass sheet assembly 10 is then placed on the surface 22. Thereafter, the heating to the desired temperature cycle, which will now be discussed.

According to the present invention, the assembly of the glass sheets 12A and 12B having the coatings of ceramic paint 18 and 20 thereon and layers of material 24A, 24B or both are conveyed through a furnace wherein the glass sheets are heated to their plastic set temperature. By the term "plastic set temperature" as the term is used herein is meant that temperature below which an applied stress will not cause permanent deformation of the glass sheet, and above which the glass sheet is capable of being permanently bent or shaped. During the conveying of the assembly of glass sheets 12A and 12B, through the furnace, they are fused together.

In general, the time required to reach the appropriate temperature will vary in accordance to the glass thickness and coefficient of expansion. The heating, fusing and annealing temperatures are also well known in the glass industry and are dependent on the coefficient of expansion, size, and thickness of the glass sheet. The ceramic paints at least partially oxidize at the elevated temperatures within the furnace and adhere tenaciously to the glass sheets. Since paints are within the glass sheets 12A and 12B, they are resistant to abrasion, and the corrosive and erosive effects of atmospheric gases and vapors.

In detail, the initial heat is the stage, which consists of heating the glass from room temperature to just above the strain point temperature. The initial heating is a slow heating range of approximately 500 degrees F. per hour. The strain point of the glass depends on the coefficient of expansion. Generally, the strain point in commercially available sheet glass may range from about 775 degrees F. to about 925 degrees F. Above the strain point. the rapid heat stage may begin. The rapid heating range is about 1200 degrees F. per hour. The fusing temperature is from about 1300 degrees F. to about 1600 degrees F. Once the temperature to fuse is reached, the glass can be held at the soak temperature until the desired fusing is accomplished. The glass may be cooled rapidly down to the annealing range of about 1000 degrees F.; the kiln or furnace may be opened or vented to lower the temperature. The annealing stage is the process of holding the furnace at a constant temperature for a given time for a given thickness of glass. Again, the soak times and temperatures for the glass will vary with the thickness and coefficient of expansions. Once the annealing soak time has passed, the anneal cool stage begins. This zone is bounded by the annealing soak temperature on the top end and the strain point on the lower end. Glass in this zone is slowly becoming more rigid. The more slowly the glass progresses though this zone, the less stress will appear in the final piece. The final stage is to cool to room temperature. This process of cooling to room temperature need only proceed slowly enough to prevent shattering.

Devitrification of the glass is a well-known occurrence that may happen when glass is heated. Some glass sheets will devitrify in the firings, if a devitrification finish is not preferred, a coat of glass glaze or ceramic paint may be painted or sprayed on top of the glass surface before firing. A preferred glass glaze is made with 50% ethyl alcohol, 10% ground glass, 1% or more tri-sodium, water, and phosphate by volume.

Figure 4:
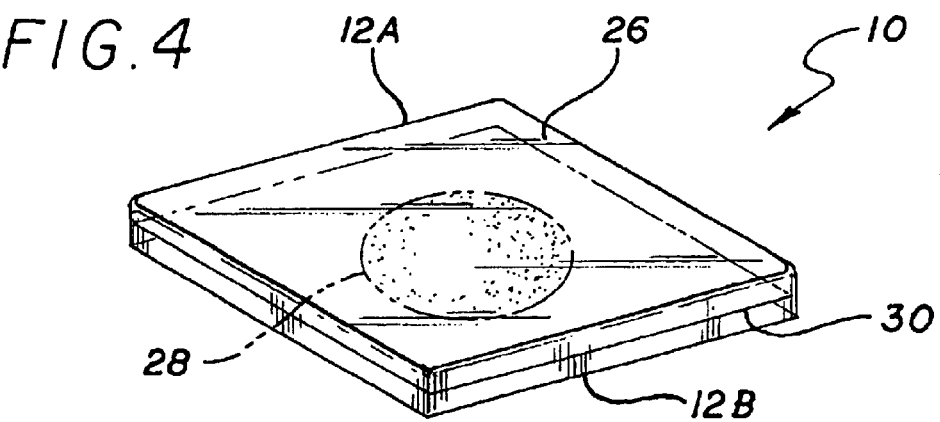
FIG. 4 is a perspective view of the completed composite glass sheet assembly.

Referring particularly to FIG. 4 the now fused glass sheets 12A and 12B, indicated by numeral 26, it can be seen that a dark spot 28 is produced at the fused surface 30 between the glass sheets 12A and 12B. It is not completely understood why and how the layer of material 24A, or 24B, or 24C work. However, it is believed that the layer of material 24A, or 24B, or 24C increases the heat build-up within the interior of the glass sandwich causing the ceramic paint layers 18 and 20 to oxidize or otherwise be destroyed producing the dark area or spot 28. To support this conclusion, a layer of material consisting of about a 1/16 inch thick of sodium chloride was applied on surface 16B. Sodium salt is known to be excellent heat transfer medium. While a dark spot was produced, the fused glass sheets cracked during cool down to room temperature due to differential cooling rates. In another test, a 0.001 inch thick copper sheet was placed on the surface 22 in the oven. Copper is also known to transfer heat effectively. It produced essentially a dark spot but it did not cause the glass fused glass sheets to fracture upon cool down.

Figure 5:
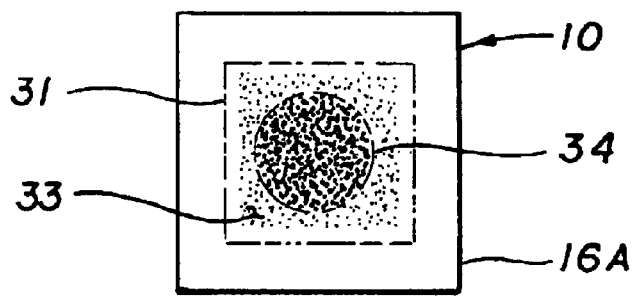
FIG. 5 is a top view of the completed composite glass sheet assembly having a copper sheet on the top surface during fusing.
Figure 6:
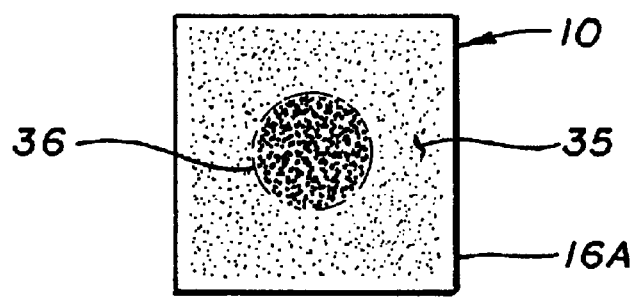
FIG. 6 is top view of the composite glass sheet shown in FIG. 1 illustrating a first method of coating the glass composite sheet assembly.
Figure 7:
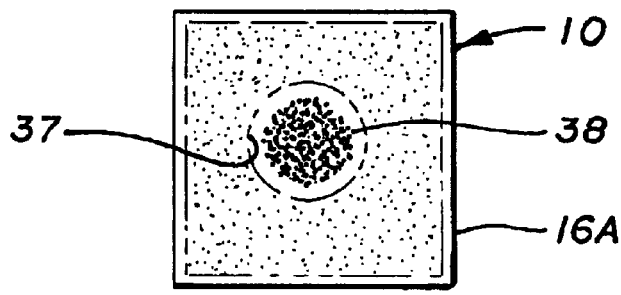
FIG. 7 is top view of the composite glass sheet shown in FIG. 1 illustrating an additional method of coating the glass composite sheet assembly.
Figure 8:
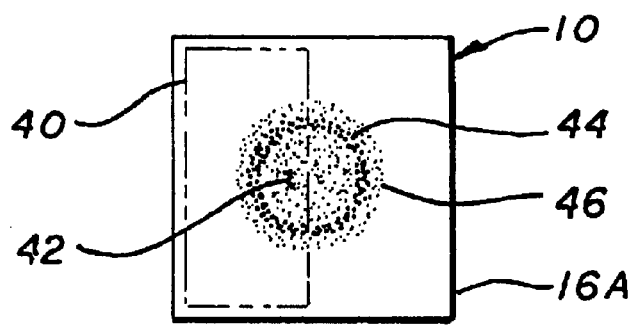
FIG. 8 is top view of the composite glass sheet shown in FIG. 1 illustrating a still further method of coating the glass composite sheet assembly.

Referring to FIG. 5, the copper foil sheet 31 when placed on surface 16A of glass sheet 12A of sandwich 10 a light discoloration (darkening) area 33 occurred under the copper foil sheet with a dark spot or area 34 formed in the middle. However, the copper sheet did tend to stick to the glass. Referring to FIG. 6, tests have shown that when surface 16A is glass sheet 12A of sandwich 10 was completely coated with a layer of Acronal binder, indicated by numeral 35, a dark area or spot 36 was formed in the middle. Referring to FIG. 7, tests have also shown that when surface 16A of glass sheet 12A of sandwich 10 was coated with polycrylate dispersion in water periphery, as indicated by numeral 36 leaving a center hole 37, a dark spot or area 38 was formed in the middle. Referring to FIG. 8, additional tests were run with the surface 16A of glass sheet 12A of sandwich 10 only half covered with an Acronal binder, indicated by numeral 40. A slightly dark spot or area 42 was formed with a darker ring 44 thereabout and a slightly dark area 46 spot extending there around. Thus to obtain the dark spot or area, at least a portion of the surface 16A or 16B need be coated or in contact with the one more of the glass sheets.

The fused glass sheets and ceramic paint with the dark spot or area can be used for architectural glazing, glass building materials and glass objects. In addition, the surface of the glass sheet is durable, resistant to atmospheric gases and vapors, and has high chemical durability. Above all, it is a natural product that can be recycled and is environmentally friendly.

While the invention has been described with reference to a particular embodiment, it should be understood that the embodiment is merely illustrative, as there are numerous variations and modifications, which may be made by those skilled in the art. Thus, the invention is to be construed as being limited only by the spirit and scope of the appended claims.

INDUSTRIAL APPLICABILITY

The invention has applicability to the ceramic tile industry.

What is claimed is:

1. A method of making a composite glass sheet comprising the steps of:

providing first and second sheets of translucent glass having first and second principle sides coating at least a portion of at least one of said first principle sides of said first and second sheets with a layer of ceramic paint;

placing said first and second sheets of coated translucent glass together such that said first principle sides are in contact with each other forming a sandwich;

contacting a layer of material on at least a portion of an external surface of at least one of said first and second glass sheets that will cause differential heating of the layer of ceramic paint applied to at least a portion of at least one of said first principle sides of said first and second sheets when the sandwich is heated to temperatures which will fuse the first and second sheets together; and heating the sandwich to a sufficient temperature for a sufficient time such that said first and second coated sheets of glass are fused together.

2. The method as set forth in claim 1 including the step of cooling the fused first and second coated glass sheets and wherein the material does not significantly effect the cooling of the fused glass sheets.

3. The method as set forth in claim 2 wherein the material is an organic binder.

4. The method as set forth in claim 3 wherein said organic binder includes carboxymethyl cellulose.

5. The method as set forth in claim 3, wherein said organic binder includes cellulose.

6. The method as set forth in claim 3, wherein said organic binder includes carbohydrates.

7. The method as set forth in claim 3, wherein said organic binder includes polyacrylates.

8. The method as set forth in claim 3, or 4, or 5, or 6 wherein said layers of ceramic paint include pigmentation.

9. The method as set forth in claim 8, wherein said ceramic paint includes metal powders selected from the group consisting of zinc, aluminum, tin, antimony, cadmium, chromium, lead, cobalt, copper, manganese, iron, silicon, titanium, tungsten, and bismuth.

10. The method as set forth in claim 9, wherein the concentration of said metal powder is between 1 and 40 percent by weight.

* * * * *